June 1, 1965  G. F. BROWN ETAL  3,186,426
PLUG-IN VALVE

Filed Nov. 27, 1961  3 Sheets-Sheet 1

Gordon F. Brown,
James K. Mosher,
INVENTORS
WHANN & McMANIGAL
Attorneys for Applicants

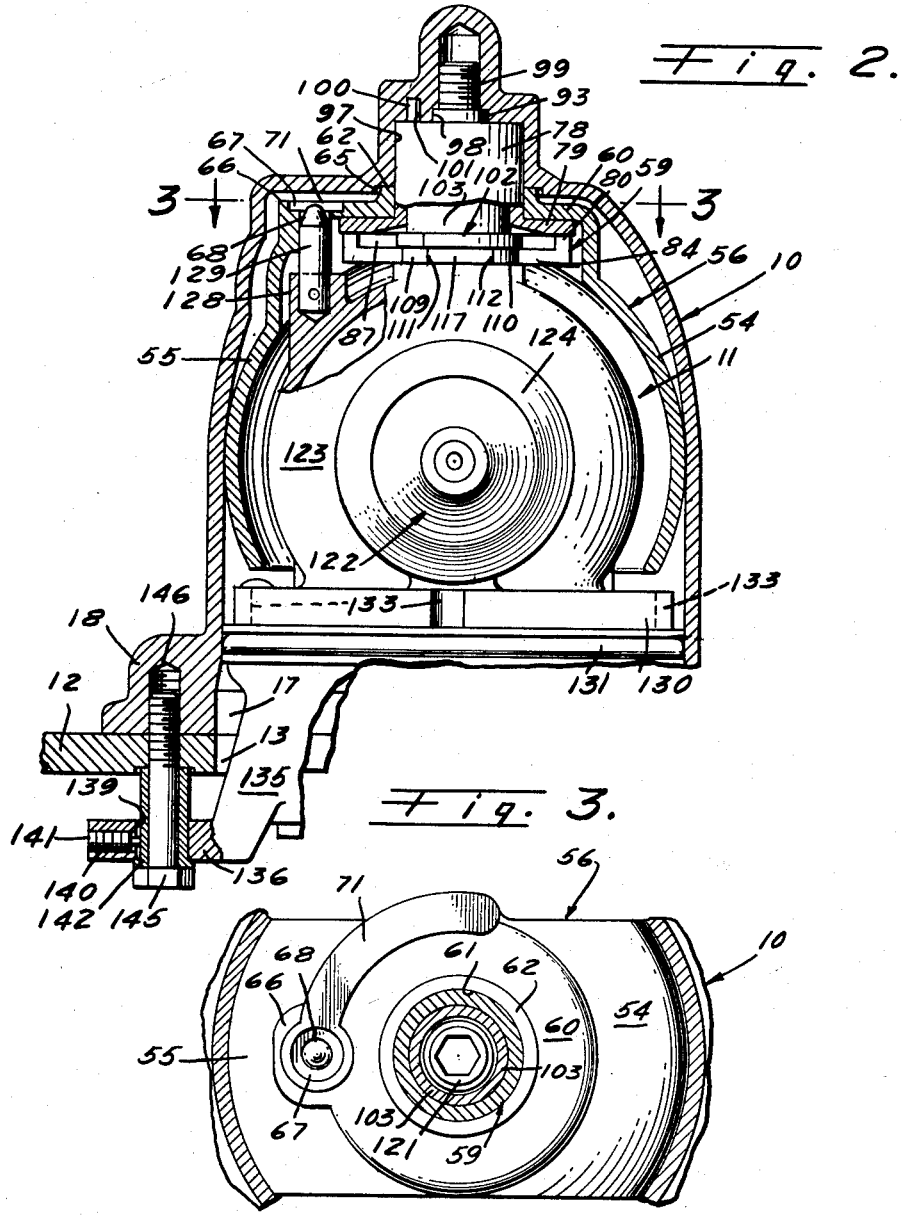

June 1, 1965 G. F. BROWN ETAL 3,186,426
PLUG-IN VALVE
Filed Nov. 27, 1961 3 Sheets-Sheet 3
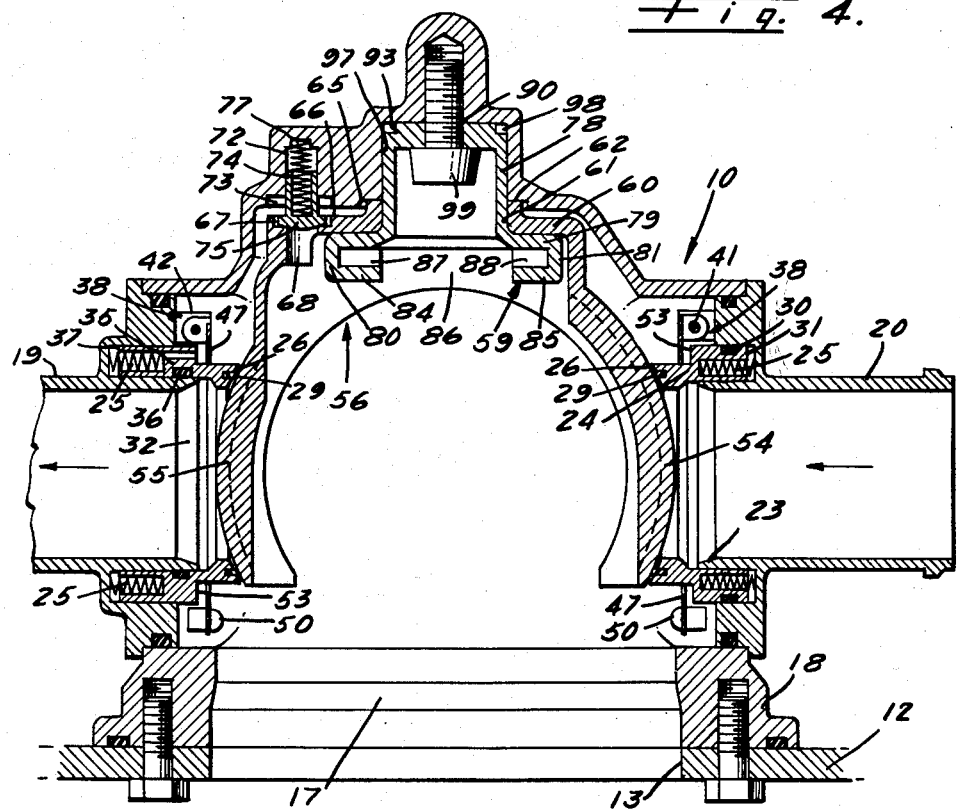
Fig. 4.
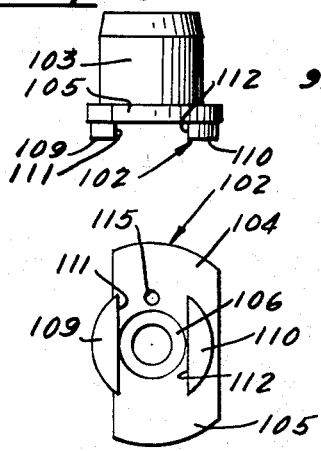
Fig. 5.
Fig. 6.
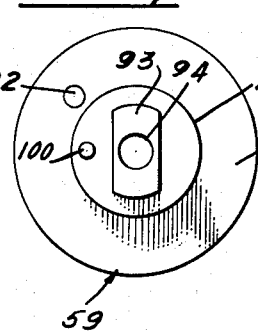
Fig. 7.
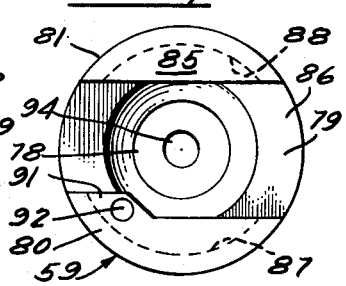
Fig. 8.
Gordon F. Brown,
James K. Mosher,
INVENTORS.
WHANN & McMANIGAL
Attorneys for Applicants
by

United States Patent Office 3,186,426
Patented June 1, 1965

3,186,426
PLUG-IN VALVE
Gordon F. Brown, Glendale, and James K. Mosher, Pasadena, Calif., assignors to Schulz Tool and Manufacturing Co., San Gabriel, Calif., a corporation of California
Filed Nov. 27, 1961, Ser. No. 155,013
13 Claims. (Cl. 137—315)

This invention relates to plug-in valves and more particularly to a dual piston plug-in valve.

It is highly desirable in certain installations, such as in aircraft fuel tanks, to be able to remove a valve without emptying the tank. This can be accomplished, according to the present invention, by providing a plug-in type of valve which is insertable into a housing in the tank and in which the housing can be sealed prior to the removal of the valve.

It is an object of the present invention to provide an improved plug-in type of valve which can be removed from its housing, with the housing sealed to attached piping.

It is another object of the present invention to provide a plug-in valve having a permanently installed housing from which the valve can be removed by displacing only one screw and then rotating the valve 90 degrees within the housing so as to seal it and position the valve so that it can be withdrawn.

It is still another object of the present invention to provide a permanently installed housing having a plug-in valve and which, as it is being removed from the housing, causes the housing to seal, and thus housing sealing means to be locked in position until the valve is again inserted into the housing.

It is a further object of the present invention to provide a plug-in type valve which, when inserted into its housing, is rotated 90 degrees to move it to its operable position where it is locked within the housing after such rotation.

It is a still further object of the present invention to provide a permanently installed housing and a plug-in valve, said housing having seats on which the valve is sealingly seated and on which a sealing means within the housing is seated when the valve is removed, said seats being displaceable so as to be moved away from said valve and sealing means when the latter two are rotated and thereby prevent damage to the valve seats.

It is another object of the present invention to provide a plug-in valve which is held in its operable position within its housing after being rotated 90 degrees after insertion and is further locked in the operable position by a single external bolt.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes only:

FIG. 2 is an end view of the valve and housing shown in FIG. 1;

FIG. 3 is a fragmentary partially cross sectional view taken as indicated by the line 3—3 in FIG. 2;

FIG. 4 is a side elevational cross sectional view of the housing shown in FIG. 1 with the valve removed and the housing sealed;

FIG. 5 is a side elevational view of a valve bayonet;

FIG. 6 is a bottom plan view of the bayonet shown in FIG. 5;

FIG. 7 is a top plan view of a housing bayonet retainer;

FIG. 8 is a bottom plan view of the bayonet retainer shown in FIG. 7;

Figure 1:
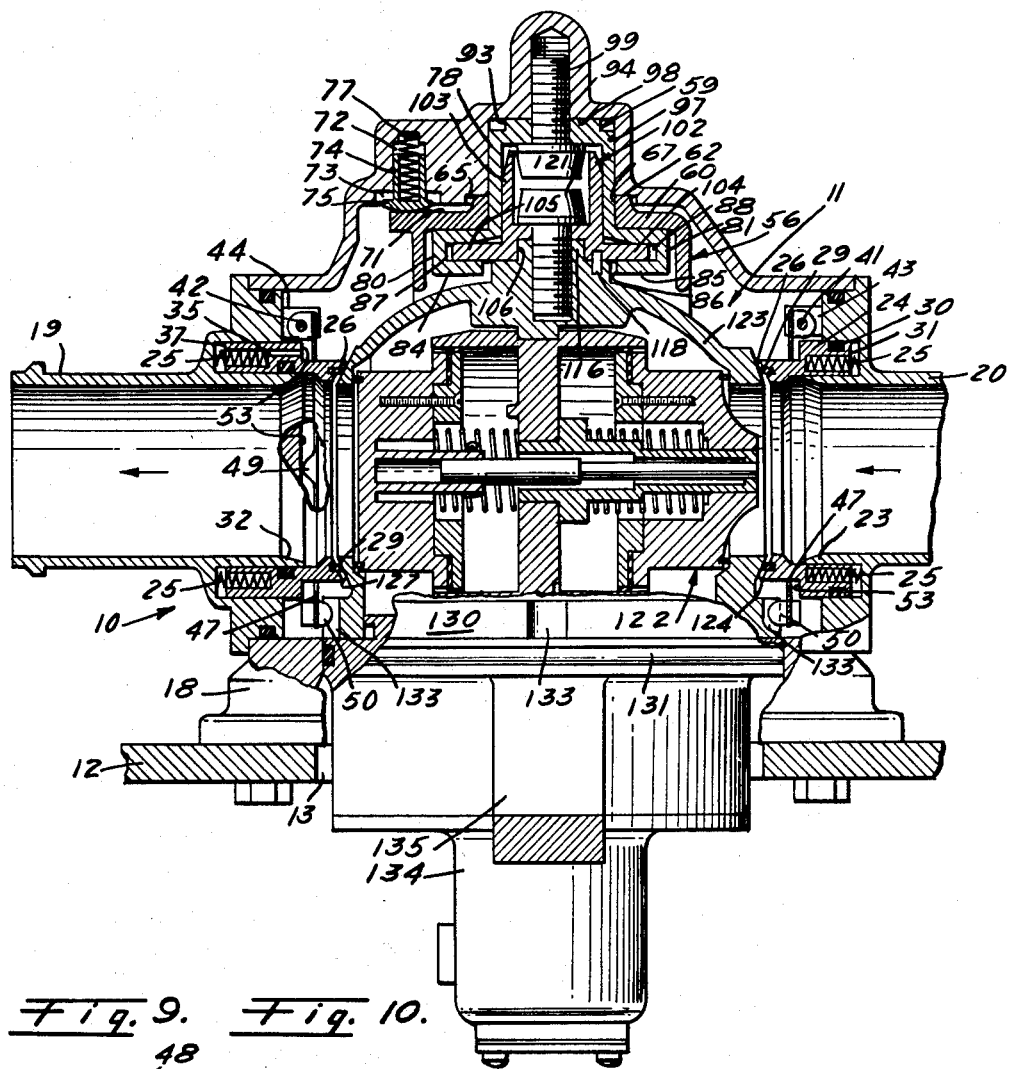
FIG. 1 is a side elevational view, partially in cross section, of a valve and housing according to the present invention, showing the valve in its operable position.
Figures 9, 10:
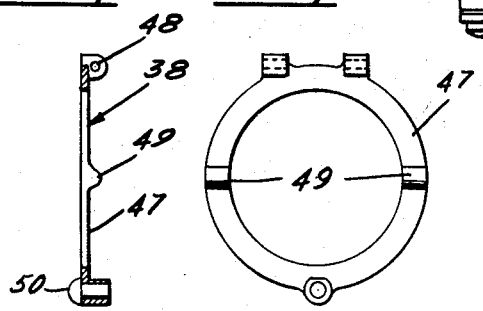
FIG. 9 is a side elevational view of a valve seat actuator.
FIG. 10 is a front elevational view of the actuator shown in FIG. 9.

Referring again to the drawings, there are shown two components of the invention, one being the generally permanently installed valve housing 10 and the other being the plug-in valve 11.

Referring now to FIG. 4, where the housing 10 is shown with the valve 11 removed, the former is shown to be sealingly bolted within a fuel tank, for example, to one of the walls 12 of the tank. The wall 12 has an opening 13 aligned with an opening 17 in the lower end of the housing formed in the base 18 and adapted to receive the valve 11. Upwardly from the base 18, at opposite ends of the housing, are fitting ends 19 and 20 sealingly secured to the housing and forming flow passages to the latter. The fitting 20 is connected to the inlet and the fitting 19 is connected to the outlet or discharge.

Slidably engaged on and surrounding the fitting 20 at its inner end 23 is a sleeve 24 biased inwardly by a plurality of springs 25. The inner surface 26 of the sleeve 24 is in the form of a concave spherical segment and has inserted therein a sealing member 29 forming a seat, also in the form of a concave spherical segment. The sleeve 24 has a seal 30 along its outer circumference, but high pressure fluid entering the flow passage 20 is permitted to leak behind the sleeve 24 and exert pressure on the larger diameter end 31 of the sleeve so that the pressure of the fluid flowing into the housing will always be exerted on the seal 29 over a larger area than at the seal itself.

Similarly to the inlet, at the outlet fitting 19, at its inner end 32, there is a sleeve 35 surrounding and slidably engaged with the tubing 19. The sleeve 35 is also biased inwardly by a plurality of springs 25 and has an inner surface 26 and seal forming seat 29 identical to that on sleeve 24. The sleeve 35 has its seal 36 in a groove in its inner circumference to prevent leakage into the valve housing. However, it should be noted that if there is a high pressure leak to the valve housing, the leaked fluid will act upon the outer end 37 of the sleeve 35 to increase the sealing effect of seat 29.

As may be best seen in FIGS. 1, 4, 9 and 10, seat actuators 38 are pivotally mounted at opposite ends of the housing on pivots 41 and 42 suspended from ears 43 and 44, respectively. Each actuator 38 is in the form of a ring 47, having at its upper end two pivot holes 48 and having on its outer face two horizontally centered, diametrical ribs 49. On the lower end and inner face is a generally semispherical cam follower 50 formed by a screw head. Each of the actuators surrounds one of the sleeves 24 and 35 and is positioned, as best seen in FIG. 1, so that the ribs 49 are in abutment with an inwardly facing shoulder 53 on each of the sleeves. Thus, any force acting on the cam followers 50 to pivot the actuators away from the center of the housing will be transferred to the center of the two sleeves on shoulder 53 to move them and the seats 29 outwardly.

In FIG. 4, the two seats are shown to be sealingly engaged with two convex spherical segments 54 and 55, closing the flow passages in the fittings 20 and 19, respectively. The spherical segments 54 and 55 are side walls of an inverted U-shaped valve socket, generally designated as 56, rotatably engaged on and secured in the housing by bayonet retainer 59. Thus, in the position shown in FIG. 4, the interior of the housing is secured from the flow passages in the fittings 19 and 20 by means of the seats 29 being sealingly engaged with the spherical segments 54 and 55.

The base 60 of the U-socket is substantially flat and substantially round, as may be seen in FIG. 3, and has a central opening 61 through which the retainer 59 extends. Surrounding the opening 61 is a shoulder 62, fitted to rotate in a recess 65 in the inner portion of housing 10. Extending off center from the base 60 is a platform 66, shown in FIGS. 2, 3 and 4, having therein a recess 67 from which extends a cylindrical opening 68, providing a passage through the base 60. As best seen in FIGS. 1 and 3, extending from the raised surface of the base relative to recess 67, is a machined surface 71 forming a quadrant path.

In alignment with recess 67 and quadrant 71, depending upon the position of rotation of socket 56, is a well 72 having a countersunk bore 73 opening into the housing. In the well 72 is a locking pin 74 having an enlarged head 75 adapted to be received in counterbore 73 when the outer surface of the head 75 is in abutment with surface 71, as shown in FIG. 1. The pin 74 is biased by spring 77 so that its head abuts surface 71 when the valve 11 is in the housing in its operable position and so that the head 75 enters recess 67, as shown in FIG. 4, so as to automatically lock the valve socket 56 on the seats 29 when it has been rotated so as to remove the valve 11. This provides the safety feature of preventing the opening of the flow passages in the fittings 20 and 19 to the interior of the housing when the valve is out of the housing.

The bayonet retainer 59, as may be best seen in FIGS. 2, 4, 7, and 8, has an open-ended cylindrical socket 78 from which extends a radial flange 79, in abutment with an inner surface of the base 60 of the valve socket. Depending from the flange 79 on diametrical portions thereof are interrupted circumferential walls 80 and 81 and extending radially inwardly therefrom are spaced flanges 84 and 85, respectively, spaced from and parallel to flange 79, forming slot 86. Spaced between flange 79 and flange 84 is a segment shaped slot 87 and, similarly, spaced between flange 79 and flange 85 is a segment shaped slot 88. On flange 84 is a radially directed extension 91, providing a support for stop pin 92, also extending into flange 79. Extending outwardly from the socket 78 is a rectangular key 93 and through the bottom of the socket and the key is a bolt hole 94. The socket of the bayonet retainer 59 is fitted in a well 97 having a keyway 98, receiving key 93 to prevent the bayonet retainer 59 from rotating in the housing 10, in which it is secured by means of a bolt 99. Extending outwardly from the socket 78 is a guide pin 100 insertable in well 101, shown in FIG. 2, in the housing, to insure that the bayonet is properly inserted into the housing.

Referring now to FIGS. 1 and 2, the plug-in valve 11 has a bayonet 102 on its inner end, best seen in FIGS. 5 and 6, adapted to be rotatably engaged in bayonet retainer 59. The bayonet is comprised of an open point end 103 of cylindrical configuration. Radially extending from the point end 103 are diametrical flange portions 104 and 105 having a recess portion 106 therebetween. Extending downwardly from the flanges 104 and 105 are extensions 109 and 110 having opposite inner facing flat sides 111 and 112, respectively and upwardly extending into flange 104 is a guide hole 115.

The bayonet 102 is fitted and secured on the inner end of the plug-in valve, as shown in FIGS. 1 and 2, with a cylindrical boss 116 on the valve extending into recess 106 of the bayonet and a flat-sided extension 117 below the boss being fitted between flat sides 111 and 112 of the bayonet, as shown in FIG. 2, to prevent relative rotation between the valve and the bayonet. A guide pin 118, shown in FIG. 1, extends into well 115 to insure the proper fitting arrangement between the bayonet and the valve. The bayonet and the plug-in valve are secured together by means of bolt 121.

The dual piston valve structure shown within the plug-in valve 11, generally designated as 122, is shown in FIG. 3 of United States Letters Patent No. 2,851,055 in which it is described and need not be described further here for the purposes of this disclosure. As may be seen in FIGS. 1 and 2, a shell 123 of the plug-in valve, surrounding the valve structure 122, is generally ellipsoidal and has convex spherical segments 124 and 127 on the ends of its major axis. The spherical segments 124 and 127 form sealing surfaces, making contact with the seats 29 on the sleeves 24 and 35, respectively, seating in the same manner as the convex spherical segments 54 and 55, the diameters of the respective spheres forming the former and latter surfaces being substantially equal.

As shown in FIG. 2, extending inwardly into the housing from the valve shell 123 is a boss 128 having secured therein an unlocking pin 129, fitted into bore 68 of the valve socket. The function of unlocking pin 129 is to force the lock pin head 75 out of recess 67 when the valve 11 is inserted into the housing so that the valve and the socket can be rotated on the bayonet retainer.

Outwardly from the valve shell 123, forming a cylindrical surface on the plug-in valve 11 is a circumferential cam surface 130 having four recesses 133 spaced at 90 degrees from each other, the latter being adapted to receive the cam followers 50 when the plug-in valve is rotated so that the cam followers are aligned with the recesses. The two recesses shown diametrically opposed in FIG. 1 are in the plane of the vertical center line of the valve shell 123, and extending through the spherical centers of the segments 124 and 127. Correspondingly, the cam followers 50 are in a plane through the centers of the spheres containing the surfaces of the seats 29, the planes of the recesses and the cam followers being coincident. The other two recesses 133, extending outwardly from the spherical segments 54 and 55 of the socket are similarly alignable with the cam followers 50, the plane through the centers of the spheres forming the segments 54 and 55 also being coincident with the plane through the centers of the spheres containing the surfaces of the seats 29 when the socket is in the position shown in FIG. 4. When the cam followers 50 are in the recesses 133, as shown in FIG. 1, the seats 29 are caused, by the springs 25, to form a seal with the spherical segments 124 and 127 on the valve shell. However, when the valve is rotated the cam followers are moved out of the recesses into contact with cam surface 130 causing the seats to be moved off the segments 124 and 127 by the pivoting action of the seat actuators 38, the ribs 49 moving the sleeves 24 and 35 outwardly. The seats are thereby protected during the short period of rotation.

Immediately outwardly of cam 130 is O-ring 131, sealing the valve 11 in the housing 10, and extending outwardly therefrom is plug-in valve structure 134 providing, for the purpose of this disclosure, means to grip and handle the plug-in valve. A strut 135 is provided to secure the plug-in valve to the tank wall and to the housing in the proper position of rotation. Extending radially outwardly from the strut is a flange portion or ear 136 having a bore 139 vertically therethrough. Horizontally directed in the ear 136 is a tapped hole 140 having therein an Allen adjusting screw 141 to hold the spacer. Through bore 139 extends a spacer 142 which can be provided of various lengths to accommodate for different thicknesses of tank wall 12 so that a solid fit can be made. A bolt 145 extending through wall 12 is threadedly engaged in a tapped hole 146 in the base 18 to secure the valve in the housing. To reduce the tolerance requirements, the bore 139 is made over size, and the spacer 142, being of the correct length for a particular installation, prevents any stress being set up in the plug-in valve when the bolt 145 is tightened in the hole 146.

In operation, considering the plug-in valve 11 to be out of the housing 10, as indicated in FIG. 4, and having the housing sealed with the spherical segments 54 and 55 on the seats 29, blocking off the flow passages in the fittings 19 and 20, the valve socket is locked in place to maintain the seals by the locking pin head 75 in the recess 67. It is this sealing arrangement which makes possible the removal of the plug-in valve from the housing for the purposes of maintenance and inspection.

To reinstall the valve, the valve is guided into the housing and valve socket through opening 17 so that the pin 129 enters bore 68 and so that the bayonet end 103 enters the bayonet retainer socket 78, the bayonet flanges 104 and 105 passing into the slot 86 of the bayonet retainer. As the valve moves inwardly, being guided by the pin 129 and the bayonet, respective recesses 133 pass over the cam followers 50 so as to not disturb the seats 29 on the spherical segments 54 and 55. After the valve has thus been inserted, the pin 129 having moved the lock 75 out of the recess 67, it and the socket 56 are free to be rotated relative to the bayonet retainer 59.

Then, to rotate the valve and socket from their positions in which they would be in FIG. 4 to that shown in FIGS. 1 and 2, they are rotated to the right 90 degrees, the locking pin head being out of recess 67 and the machined path 71 rotating on the head to that position shown in FIG. 1. As the valve and the valve socket are rotated, the cam surface 130 comes into contact with the cam followers 50 to pivot the seat actuators 38 on the pivots 42 so as to move the sleeves 24 and 35 outwardly of the housing when the ribs 49 are moved outwardly, centrally on the seat actuators. When the valve has been moved its full 90 degrees, the recesses 133 are in alignment with the cam followers, as shown in FIG. 1, and the seats 29 form seals on the spherical surfaces 124 and 127 of the valve shell 123. Simultaneously, the bayonet flanges 104 and 105 have been rotated to the position shown in FIG. 1 so that the valve is positively retained in the housing.

When the valve is thus positioned, the bore 139 in the flange member 136 will be in alignment with the tapped hole 146 in base member 18 of the housing, as shown in FIG. 2. A proper length spacer 142, being held in position by screw 141, properly positions the flange 136 so that the tightening of bolt 145 will not put any stress on the valve. After the bolt has been so tightened, the valve is then ready for use. To remove the valve, the procedure just described is reversed.

It is clear from the foregoing that the locking means and the sealing means provided to seal the housing from the flow passages in the fittings 19 and 20 eliminate the necessity for draining the fuel tanks when maintenance or inspection is required on the valve component. Similarly, the structure provided assures positive correct insertion of the valve into the housing and provides simple bayonet retaining means for the valve in the housing and a further single bolt to secure the valve against rotation.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description and all changes which come within the meaning and range of equivalency of the claims are, therefore, intended to be embraced therein.

We claim:

1. In a plug-in valve assembly: a housing having an opening adapted to receive a plug-in valve; two flow passages disposed in opposite ends of said housing; displaceable valve seats extending into said housing from said flow passages, said seats extending inwardly into said housing from floating sleeves surrounding and being in slidable engagement with said flow passages; a plug-in valve in said housing having been inserted into said opening, said valve being rotatable in said housing from a removable position to a position in alignment with said flow passages to seat on said seats, said plug-in valve having an open condition in said last position in which flow communication is provided through said housing and said flow passages and a closed condition in said last position in which said plug-in valve cooperates with said seats to arrest flow through said housing; means in said housing to retain said plug-in valve therein when said valve is aligned with said flow passages; means within said housing to seat on said valve seats and seal said flow passages when said valve is rotated to its removable position, said last means being rotatable with said valve so as to rotate away from said valve seats as said valve is rotated toward said valve seats; and means to displace said valve seats away from said valve and said last means while said valve and said last means are being rotated.

2. In a plug-in valve assembly: a housing having an opening to receive and from which a valve can be removed; a valve in said housing, said valve being rotatable in said housing from a removable position to an operable position; means within said housing to retain said valve therein when it is in its operable position; two flow passages disposed in opposite ends of said housing, said passages being aligned with said valve in its operable position; floating sleeves being in slidable engagement with said flow passages and extending toward said valve; valve seats on said sleeves aligned to form seals on said valve in its operable position, said valve having an open condition in said last position in which flow communication is provided through said housing and said flow passages and a closed condition in said last position in which said valve cooperates with said seats to arrest flow through said housing; rotatable means secured within said housing adapted to be aligned by rotation to seat on said valve seats and seal said flow passages from said housing when said valve is rotated to its removable position; spring biasing said sleeves and seats toward said valve and said last means when in respective alignments therewith, said last means being rotatable with said valve so as to rotate away from said valve seats as said valve is rotated toward said valve seats; and means to displace said valve seats away from said valve and said last means while said valve and said last means are being rotated.

3. In a plug-in valve assembly: a housing; a valve in said housing, said valve being removable from said housing through an opening therein, said valve being rotatable in said housing from a removable position to an operable position; means within said housing to retain said valve therein when it is in its operable position; two flow passages disposed in opposite ends of said housing, said passages being aligned with said valve in its operable position; flowing sleeves surrounding and being in slidable engagement with said flow passages and extending toward said valve; valve seats on said sleeves aligned to form seals on said valve in its operable position, said valve having an open condition in said last position in which flow communication is provided through said housing and said flow passages and a closed condition in said last position in which said valve cooperates with said seats to arrest flow through said housing; a valve socket within said housing, said valve extending within said socket, said socket being rotatable with said valve, said socket being rotatable to be aligned to seat on said valve seats and seal said flow passages from said housing when said valve is rotated to its removable position; springs biasing said sleeves and seats toward said valve and said socket when in respective alignments therewith; and cam means on said valve cooperating with cam follower means adjacent said sleeves to displace said seats away from said valve and said socket while said valve and socket are being rotated.

4. In a plug-in valve assembly: a housing having an open end; a valve in said housing; a bayonet on an inner end of said valve within said housing; a bayonet retainer secured within said housing, said bayonet being rotatable within said retainer and said valve being rotatable with said bayonet from a removable position to a secured operable position; two flow passages disposed in opposite ends of said housing, said passages being aligned with said valve in its operable position; floating sleeves surrounding and being in slidable engagement with said flow passages and extending toward said valve; valve seats on said sleeves aligned to form a seal on said valve in its operable position, said valve having an open condition in said last position in which flow communication is provided through said housing and a closed condition in said last position in which said valve cooperates with said seats to arrest flow through said housing; a valve socket within said housing, said valve extending within said socket, said socket being rotatable with said valve, said socket being rotatable to be aligned to seat on said valve seats and seal said flow passages from said housing when said valve is rotated to its removable position; springs biasing said sleeves and seats toward said valve and said socket when in respective alignments therewith; and cam means on said valve cooperating with cam follower means adjacent said sleeves to displace said seats away from said valve and said socket while said valve and socket are being rotated.

5. In a plug-in valve assembly: a housing having an open end; a valve in said housing; a bayonet on an inner end of said valve within said housing; a bayonet retainer secured within said housing, said bayonet being rotatable within said retainer and said valve being rotatable with said bayonet from a removable position to a secured operable position; two flow passages disposed in opposite ends of said housing, said passages being aligned with said valve in its operable position; floating sleeves surrounding and being in slidable engagement with said flow passages and extending toward said valve; valve seats on said sleeves aligned to form a seal on said valve in its operable position, said valve having an open condition in said last position in which flow communication is provided through said housing and a closed condition in said last position in which said valve cooperates with said seats to arrest flow through said housing; a valve socket within said housing, said valve extending within said socket, said socket being rotatable with said valve, said socket being rotatable to be aligned to seat on said valve seats and seal said flow passages from said housing when said valve is rotated to its removable position; springs biasing said sleeves and seats toward said valve and said socket when in respective alignments therewith; automatic means to lock said socket against rotation on said seats when said valve is removed from said housing; means on said valve to automatically unlock said socket to free it to rotate when said valve is inserted into said housing; and cam means on said valve cooperating with cam follower means adjacent said sleeves to displace said seats away from said valve and said socket while said valve and socket are being rotated.

6. In a plug-in valve assembly: a housing having an open end; a valve in said housing; a bayonet on an inner end of said valve within said housing; a bayonet retainer secured within said housing, said bayonet being rotatable within said retainer and said valve being rotatable with said bayonet from a removable position to a secured operable position; two flow passages disposed in opposite ends of said housing, said passages being aligned with said valve in its operable position; floating sleeves surrounding and being in slidable engagement with said flow passages and extending toward said valve; concave spherical segments forming valve seats on said sleeves; convex spherical segments on opposite ends of said valve being aligned to mate with corresponding said concave valve seats to form seals on said valve in its operable position, said valve having an open condition in said last position in which flow communication is provided through said housing and a closed condition in said last position in which said valve cooperates with said seats to arrest flow through said housing; a valve socket within said housing, said valve extending within said socket, said socket being rotatable with said valve, said socket being rotatable to be aligned to seat on said valve seats and seal said flow passages from said housing when said valve is rotated to its removable position; springs biasing said sleeves and seats toward said valve and said socket when in respective alignments therewith; automatic means to lock said socket against rotation on said seats when said valve is removed from said housing; means on said valve to automatically unlock said socket to free it to rotate when said valve is inserted into said housing; and cam means on said valve cooperating with cam follower means adjacent said sleeves to displace said seats away from said valve and said socket while said valve and socket are being rotated.

7. In a plug-in valve assembly: a housing having an open end; a valve in said housing; a bayonet on an inner end of said valve within said housing; a bayonet retainer secured within said housing, said bayonet being rotatable within said retainer and said valve being rotatable with said bayonet from a removable position to a secured operable position; two flow passages disposed in opposite ends of said housing, said passages being aligned with said valve in its operable position to permit flow therethrough when said valve is open; floating sleeves surrounding and being in slidable engagement with said flow passages and having their inner ends extending toward said valve, the outer ends of said sleeves being responsive to the ambient pressures in said housing; concave spherical segments forming valve seats on said sleeves; convex spherical segments on opposite ends of said valve being aligned to mate with corresponding said concave valve seats to form seals on said valve in its operable position, said valve having an open condition in said last position in which flow communication is provided through said housing and a closed condition in said last position in which said valve cooperates with said seat to arrest flow through said housing; a valve socket within said housing, said valve extending within said socket, said socket being rotatable with said valve, said socket being rotatable to be aligned to seat on said valve seats and seal said flow passages from said housing when said valve is rotated to its removable position; springs biasing said sleeves and seats toward said valve and said socket when in respective alignments therewith; a spring biased pin within said housing biased toward said socket and movable into a recess in said socket, when said valve is rotated to its removable position and removed, to lock said socket against rotation and on said seats; a detent extending from the inner end of said valve alignable with said pin to move it from said recess against its spring and unlock said socket when said valve is inserted into said housing in its removable position; and ring actuators pivotally mounted in its housing and surrounding said sleeves, said actuators each having a cam follower extending toward a cam surface formed on the periphery of said valve, said cam surface having four spaced recesses positioned to receive said cam followers when said valve is moved to its operable and removable positions to respectively permit said seats to seat on said valve and said socket, said cam followers being moved out of said recesses when said valve is rotated out of said positions to cause ribs centrally on said actuators to displace said seats from said valve and socket respectively during said rotation.

8. In a plug-in valve assembly: a housing having an opening adapted to receive a plug-in valve; flow passages connected to said housing; displaceable valve seats in said housing in alignment with and adjacent corresponding flow passages; a plug-in valve in said housing insertable into said opening and being rotatable from an insertable position to an operable position in alignment with said flow passages to seat on said seats, said plug-in valve having an open condition in said last position in which flow communication is provided through said housing and flow passages and a closed condition in said last position in which said plug-in valve cooperates with said seats to arrest flow through said housing; means to retain said plug-in valve in said housing; means within said housing to seat on said valve seats and seal said said flow passages when said valve is removed from said housing, said last means being rotatable with said valve so as to rotate away from said valve seats as said valve is rotated toward said valve seats; and means to displace said valve seats away from said valve and said last means while said valve and said last means are being rotated.

9. In a plug-in valve assembly: a housing having an opening adapted to receive a plug-in valve, said housing having flow passages; displaceable valve seats in said housing in alignment with and adjacent corresponding flow passages; a plug-in valve in said housing insertable into said opening and being rotatable from an insertable position to an operable position in alignment with said flow passages to seat on said seats, said plug-in valve having an open condition in said last position in which flow communication is provided through said housing and said flow passages and a closed condition in said last position in which said plug-in valve cooperates with said seats to arrest flow through said housing; means to retain said plug-in valve in said housing; means within said housing to seat on said valve seats and seal said flow passages when said valve is removed from said housing, said last means being rotatable away from said valve seats when said valve is rotated toward said valve seats; and means to displace said valve seats away from said valve and said last means while said valve and said last means are being rotated.

10. In a plug-in valve assembly: a housing having an opening adapted to receive a plug-in valve, said housing having flow passages; valve seats in said housing in alignment with and adjacent corresponding flow passages; a plug-in valve in said housing insertable into said opening and being rotatable from an insertable position to an operable position in alignment with said flow passages to seat on said seats, said plug-in valve having an open condition in said last position in which flow communication is provided through said housing and said flow passages and a closed condition in said last position in which said plug-in valve cooperates with said seats to arrest flow through said housing; means to retain said plug-in valve in said housing; means within said housing to seat on said valve seats and seal said flow passages when said valve is removed from said housing, said last means being rotatable away from said valve seats when said valve is rotated toward said valve seats; automatic means to lock said last means against rotation on said seats when said valve is removed from said housing; and means on said valve to automatically unlock said last means to free it to rotate when said valve is inserted into said housing.

11. In a plug-in valve assembly: a housing having an opening adapted to receive a plug-in valve, said housing having flow passages; displaceable valve seats in said housing in alignment with and adjacent corresponding flow passages; a plug-in valve in said housing insertable into said opening and being rotatable from an insertable position to an operable position in alignment with said flow passages to seat on said seats, said plug-in valve having an open condition in said last position in which flow communication is provided through said housing and said flow passages and a closed condition in said last position in which said plug-in valve cooperates with said seats to arrest flow through said housing; means to retain said plug-in valve in said housing; means within said housing to seat on said valve seats and seal said flow passages when said valve is removed from said housing, said last means being rotatable away from said valve seats when said valve is rotated toward said valve seats; automatic means to lock said last means against rotation on said seats when said valve is removed from said housing; means on said valve to automatically unlock said last means to free it to rotate when said valve is inserted into said housing; and means to displace said valve seats away from said valve and said last means while said valve and said last means are being rotated.

12. In a plug-in valve assembly: a housing having an opening adapted to receive a plug-in valve, said housing having flow passages; displaceable valve seats in said housing in alignment with and adjacent corresponding flow passages; a plug-in valve in said housing insertable into said opening and being rotatable from an insertable position to an operable position in alignment with said flow passages to seat on said seats, said seats being biased to form a seal on said plug-in valve, said plug-in valve having an open condition in said last position in which flow communication is provided through said housing and said flow passages and a closed condition in said last position in which said plug-in valve cooperates with said seats to arrest flow through said housing; means to retain said plug-in valve in said housing; and means within said housing to seat on said biasing valve seats and seal said flow passages when said valve is removed from said housing, said last means being rotatable away from said valve seats when said valve is rotated toward said valve seats.

13. In a plug-in valve assembly: a housing having an opening adapted to receive a plug-in valve; flow passages connected to said housing; displaceable valve seats in said housing in alignment with and adjacent corresponding flow passages; a plug-in valve in said housing insertable into said opening and being rotatable from an insertable position to an operable position in alignment with said flow passages to seat on said seats, said plug-in valve having an open condition in said last position in which flow communication is provided through said housing and flow passages and a closed condition in said last position in which said plug-in valve cooperates with said seats to arrest flow through said housing; means to retain said plug-in valve in said housing; means within said housing to seat on said valve seats and seal said flow passages when said valve is removed from said housing, said last means being rotatable with said valve so as to rotate away from said valve seats as said valve is rotated toward said valve seats; means to displace said valve seats away from said valve and said last means while said valve and said last means are being rotated; automatic means to lock said last means against rotation on said seats when said valve is removed from said housing; and means on said valve to automatically unlock said last means to free it to rotate when said valve is inserted into said housing.

References Cited by the Examiner

UNITED STATES PATENTS

| | | | |
|---|---|---|---|
| 2,661,926 | 12/53 | Resek | 251—159 XR |
| 2,851,055 | 9/58 | Mosher | 137—400 |
| 2,883,146 | 4/59 | Knox | 251—159 |
| 2,997,057 | 8/61 | Toth | 137—315 |

ISADOR WEIL, *Primary Examiner.*